United States Patent [19]

Rogowsky

[11] 4,222,097
[45] Sep. 9, 1980

[54] CONTROL OF HIGH-VOLTAGE D.C. TRANSMISSION SYSTEMS

[75] Inventor: York Rogowsky, Berlin, Fed. Rep. of Germany

[73] Assignee: LICENTIA Patent-Verwaltungs-G.m.b.H., Frankfurt am Main, Fed. Rep. of Germany

[21] Appl. No.: 952,050

[22] Filed: Oct. 17, 1978

[30] Foreign Application Priority Data

Oct. 18, 1977 [DE] Fed. Rep. of Germany ....... 2747136

[51] Int. Cl.² .............................................. H02M 7/00
[52] U.S. Cl. ........................................ 363/51; 363/37; 363/85; 363/96
[58] Field of Search .................................... 363/50–51, 363/35, 37, 65, 69–70, 84–87, 96, 128–129; 307/82, 127

[56] References Cited

U.S. PATENT DOCUMENTS

| | | | |
|---|---|---|---|
| 3,559,036 | 1/1971 | Kanngiesser | 363/51 |
| 3,600,662 | 8/1971 | Anwander | 363/35 |
| 3,694,728 | 9/1972 | Kanngiesser et al. | 363/51 |
| 3,707,669 | 12/1972 | Kanngiesser et al. | 363/51 |
| 3,801,895 | 4/1974 | Kanngiesser et al. | 363/35 |
| 3,978,389 | 8/1976 | Juhlin | 363/65 |

Primary Examiner—J. D. Miller
Assistant Examiner—Peter S. Wong
Attorney, Agent, or Firm—Spencer & Kaye

[57] ABSTRACT

In a control apparatus for connecting three-phase current systems having respectively different frequencies to a high-voltage D.C. transmission system, the apparatus including at least two units connected to operate in parallel during normal operation and each composed of a rectifier group and an inverter group, and components permitting one of the units to operate with its energy direction reversed in unusual situations, there are further provided: an individual power regulator for each unit connected to receive a desired power signal indicating the magnitude and direction of power transmission by that unit; a common regulator connected to all of the power regulators for supplying thereto, in normal operation, the desired power signal based on the total power for all of the units; a voltage regulator for the three-phase voltage of one of the lines associated with the one unit and providing a signal representative of the magnitude of that voltage; and a device switching the control of the regulator for the one unit from the common regulator to the voltage regulator, upon occurrence of an unusual situation, to cause reversed energy direction operation to occur at an energy level proportional to the value of the signal provided by the voltage regulator.

5 Claims, 3 Drawing Figures

4,222,097

CONTROL OF HIGH-VOLTAGE D.C. TRANSMISSION SYSTEMS

BACKGROUND OF THE INVENTION

The present invention relates to control apparatus for high voltage D.C. transmission systems, for permitting connection of several three-phase current mains having different frequencies, of the type including at least two units operating in parallel during normal operation and each composed of a rectifier group and an inverter group, arranged so that, in unusual situations, one of the units is operated with its energy direction reversed. In such systems, especially for across-line couplings consisting of several units, it is desirable that when the total power is not utilized one of the units be operated to conduct energy in the reverse direction in order to produce a greater than normal total reactive power usage.

SUMMARY OF THE INVENTION

The principal requirements of such apparatus and the central objects of the invention are, on the one hand, to transmit a certain effective power between the lines, and at the same time regulate the frequency of one of the connected lines, and on the other hand, to maintain at a constant level the bus-bar voltage of one of the lines by means of the adjusted reactive power.

These and other objects are achieved in a control apparatus for a high-voltage D.C. transmission system connecting three-phase current systems having respectively different frequencies, the apparatus including at least two units connected to operate in parallel during normal operation and each composed of a rectifier group and an inverter group, and means permitting one of the units to operate with its energy direction reversed in unusual situations, by the provision of: an individual power regulator for each unit connected to receive a desired power signal indicating the magnitude and direction of power transmission by that unit; a common regulator connected to all of the power regulators for supplying thereto, in normal operation, the desired power signal based on the total power for all of the units; a voltage regulator for the three-phase voltage of one of the lines associated with the one unit and providing a signal representative of the magnitude of that voltage; and means switching the control of the regulator for the one unit from the common regulator to the voltage regulator, upon occurrence of an unusual situation, to cause reversed energy direction operation to occur at an energy level proportional to the value of the signal provided by the voltage regulator.

The mechanism according to the invention operates exclusively with closed control loops, and is thus superior to any other conceivable characteristic controls, in that it is independent of the parameters of the energy system.

Since the units are first operated at full D.C. voltage, the best possible effeciency level is maintained. Owing to the fact that the transformer adjustment is removed from operation only on the regulated side, the operation of the reversible unit at reduced D.C voltage can be controlled in such a way that the reactive power on the unregulated side does not increase by the same amount.

DESCRIPTION OF THE PREFERRED EMBODIMENTS

Figure 1:
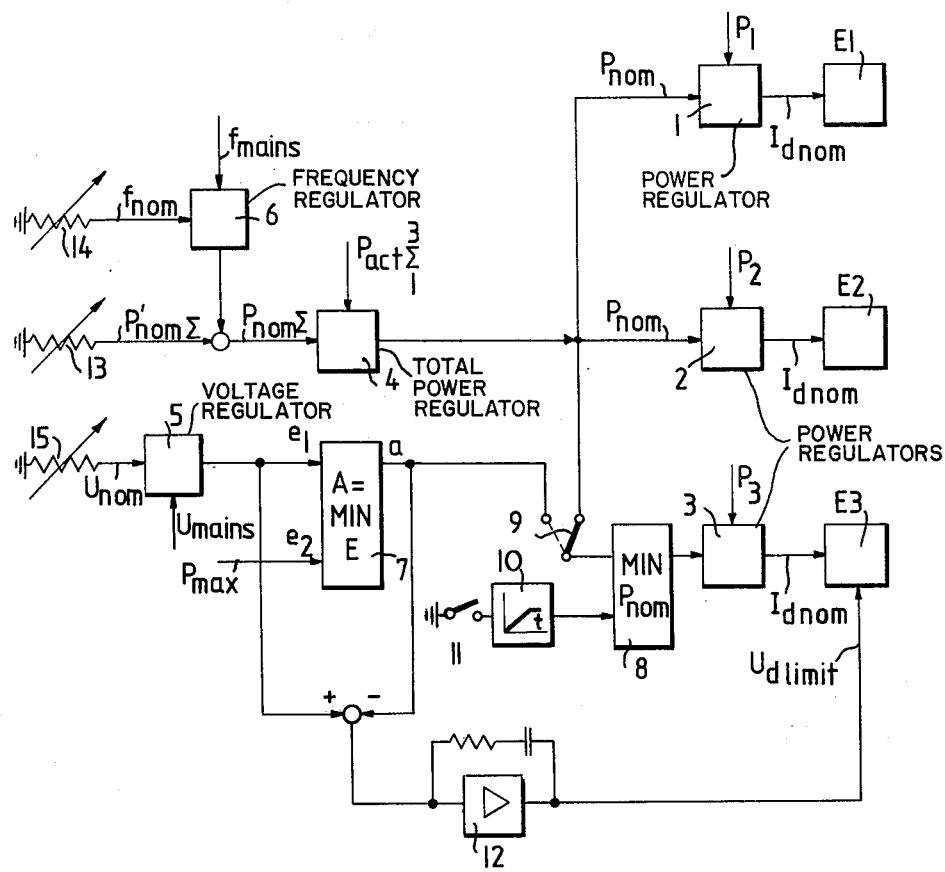
FIG. 1 is a basic circuit diagram of a control apparatus according to the invention disposed at a connecting side of a high-voltage D.C. transmission system.

The circuit shown in FIG. 1 includes a connection which, in the illustrated embodiment, is composed of three units E 1, E 2 and E 3. Each unit is connected to a respective, individually associated power regulator 1, 2, or 3. Each regulator supplies a signal representing the nominal, or desired, value, $I_{d\ nom}$, for the respective direct current to be transmitted. Control variables supplied to regulators 1, 2 and 3 are signals $P_1$, $P_2$ and $P_3$, respectively, corresponding to the respective power outputs to be transmitted. At the same time all three regulators are supplied with a reference input representing the desired power, $P_{nom}$, for that regulator. The sign of $P_{nom}$ determines the direction of energy flow and the value of $P_{nom}$ is itself determined by a total power regulator 4. Regulator 4 produces the signal $P_{nom}$ as the difference between the predetermined desired total power $P_{nom\ \Sigma}$ and the actual total transmitted power $$P_{act}\overset{3}{\underset{1}{\Sigma}}$$

of the three units. Signal $P_{nom\ \Sigma}$ is produced by summation of a total power signal $P'_{nom\ \Sigma}$ whose value is set by a potentiometer 13, and a signal produced by a frequency regulator 6. This frequency regulator 6 forms a signal component representing the difference between the desired frequency $f_{nom}$, which is set for one of the 3-phase voltage lines to be connected, and is set by means of a potentiometer 14, and the frequency $f_{mains}$ existing in the line.

Unit E 3 provided here is the unit which is, in unusual situations, operated with reversed energy direction. For this purpose the control circuit possesses a switch 9, shown in the normal position, which in an unusual situation switches to the broken-line position to connect the power controller 3 for unit E 3 over to a voltage regulator 5, such that for a raised 3-phase voltage $U_{mains}$ in one of the connected lines, the power of unit E 3 is raised in the opposite direction. Voltage regulator 5 also receives a reference signal $U_{nom}$ representing the desired 3-phase voltage. The value of that signal is set by a potentiometer 15.

The removal of unit E 3 from the total power regulator for the purpose of reversed operation is achieved by slowly reducing its desired power value $P_{nom}$ to zero via element 8. The total power regulator, which continues to be effective for the other units E 1 and E 2, is still able to maintain the total power at a constant level. After the removal of unit E 3 from the power regulator, that unit is supplied, as described above, with its desired power level reference input from the line voltage regulator 5 and thus the reactive power requirement increases for a rise in the desired (effective) power level of unit E 3. As a result, the current and thus the reactive power in units E 1 and E 2 also increase, to compensate the reverse power across unit E 3 under control of the total power regulator 4 effecting power flow in the "normal" direction.

When the power across unit E 3 can be raised no further, the additional remaining reactive power requirement is raised by switching into the electronic voltage limiting regulator of unit E 3. Each unit has such a regulator but they are not illustrated. The voltage limiting regulator for unit E 3, which acts upon the semiconductor element control of unit E 3, is then supplied with its desired value for the voltage limiting level, $U_{d\ limit}$, by the voltage regulator 5, such that at a higher 3-phase voltage, the desired value for the limit of the D.C. voltage is reduced.

The voltage limiting regulator becomes effective only when the highest possible power level, $P_{max\ E\ 3}$, of unit E 3 is fully utilized. For this purpose, a comparison element 7 is provided and is supplied with a signal $e_2$ representing the maximum power level, $P_{max\ E\ 3}$, of unit E 3 and a signal $e_1$ constituting the control deviation signal from voltage regulator 5, and which delivers the smaller of its two input signals to its output.

The limit level signal $U_{d\ limit}$ is derived by a variable-gain amplifier 12 from the difference between the control deviation signal from regulator 5 and the output of element 7 and delivers it to the semiconductor element control of unit E 3. For operation with reversed energy direction, i.e. backward-operation, a time-dependent ramp function signal is provided by function generator 10 upon closing of switch 11 and is delivered to element 8 in order to effect a gradual reduction of the desired power of unit E 3 to zero. Generator 10 is then deactuated after connection is made to voltage regulator 5. Switch 9 is operated by a device which senses whether the gradual reduction of the desired power of unit E 3 has come to zero or not. When the reduction has come to zero, switch 9 is shifted to make connection to voltage regulator 5. Switch 11 then will open again.

Figure 2:
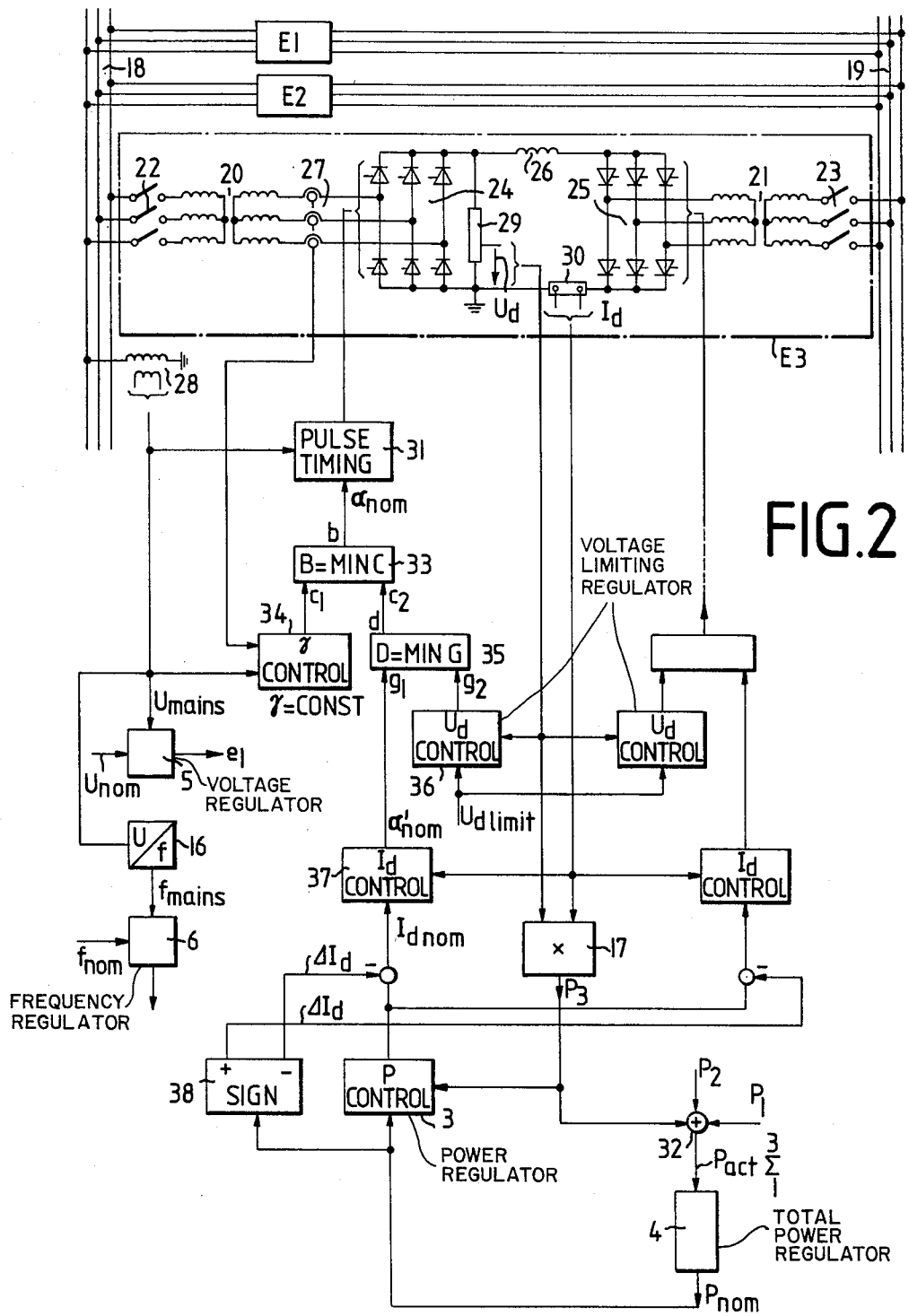
FIG. 2 is a basic circuit diagram showing the connections between the control system according to FIG. 1, a DC-transmission system and two three-phase alternating current systems, including those connections required for power transmission and control signal generation.

The circuit shown in FIG. 2 includes the power transmission lines between two three-phase current mains 18 and 19 having different frequencies, with the three units E 1, E 2 and E 3 operating in parallel during normal operation. Unit E 3 is shown in detail, consisting of power switches 22, 23 (to cut off the unit from the mains 18 and/or 19), transformers 20, 21, a rectifier group 24, a smoothing coil 26 and an inverter group 25. In case energy direction is reversed, group 24 operates as an inverter while group 25 operates as a rectifier.

Control signals for the control apparatus according to the invention are derived via a voltage transformer 28 (signal representative of the voltage of the mains 18) and a current transformer 27 (signal representative of the alternating current through group 24) as well as a voltage divider 29 (signal representative of the D.C. voltage $U_d$) and a shunt 30 (signal representative of the direct current $I_d$). The signal from voltage transformer 28 is supplied as the actual mains voltage $U_{mains}$ to the voltage regulator 5, and transformed by a voltage to frequency transformer 16, as the actual mains frequency $f_{mains}$ to the frequency regulator 6. The other connections of regulators 5 and 6 are as shown completely in FIG. 1.

The signal $P_3$ is obtained by supplying a multiplier 17 with the signals $U_d$ and $I_d$ from the voltage divider 29 and the shunt 30 respectively. The signal $P_3$ is summed up at 32 together with signals $P_2$ and $P_1$ which are derived from units E 1 and E 2 the same way $P_3$ is from unit E 3. These three signals summed up result in the actual total transmitted power $$P_{act}\sum_1^3$$

which is supplied to the total power regulator 4. Regulator 4 produces the signal $P_{nom}$ as the difference between the actual total transmitted power $$P_{act}\sum_1^3$$

and the predetermined desired total power $P_{nom\ \Sigma}$ (not shown in FIG. 2). Signal $P_{nom}$, representing the desired power, is fed into power regulator 3 together with signal $P_3$ representing the actual transmitted power by unit E 3.

The output signal of regulator 3 is the desired value $I_{dnom}$ of the direct current flowing in unit E 3. Signal $I_{dnom}$ is fed into the current control regulator 37 as well as the actual value of current $I_d$ derived from shunt 30. A signum control device 38 senses the algebraic sign of signal $P_{nom}$ thus supplying according to the sign a supplementary value $-\Delta I_d$ to the output of the power regulator 3.

The output of regulator 37 is the desired firing angle $\alpha'_{nom}$ for the pulse timing device 31 which controls the firing of the valves of group 24 by using the voltage $U_{mains}$ derived from voltage transformer 28. The desired firing angle $\alpha'_{nom}$ may be corrected to a value $\alpha_{nom}$ first of all by a comparison element 35, the output signal d which is the smaller of the signals $g_1$ or $g_2$; $g_1$ being the signal $\alpha'_{nom}$. Signal $g_2$ is the output of the D.C. voltage control device, or voltage limiting regulator, 36 comparing the actual D.C. voltage $U_d$ derived from voltage divider 29 with the desired value which is the limit level signal $U_{dlimit}$ coming from amplifier 12 shown in FIG. 1.

Signal $\alpha_{nom}$ is obtained as output signal b by another comparison element 33, this signal being the smaller of the input signals $c_1$ or $c_2$. Signal $c_2$ is the output signal d of element 35. Signal $c_1$ is the output signal of the extinction angle $\gamma$-control device 34, which regulates the extinction angle $\gamma$ to a constant value using the mains voltage $U_{mains}$ via voltage transformer 28 and the alternating current through group 24 via current transformer 27.

Regulator and comparison elements as described for the left hand side of FIG. 2 in connection with the pulse timing for group 24 are to be used in the same way in connection with the pulse timing for group 25. This is not shown in detail but just indicated.

Figure 3:
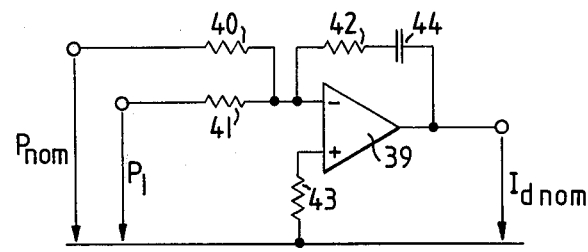
FIG. 3 is a circuit diagram of an embodiment of a regulator used in the control apparatus according to FIG. 1.

In FIG. 3 is shown a circuit diagram of regulator 1. The input signals $P_{nom}$ and $P_1$ are fed into an amplifier 39 via resistors 40 and 41. The second input is grounded via resistor 43. A resistor 42 and a capacitor 44 are used for feed-back. The output is the desired value $I_{dnom}$. All regulators used within the control apparatus according to the invention do have similar circuits.

It will be understood that the above description of the present invention is susceptible to various modifications, changes and adaptations, and the same are intended to be comprehended within the meaning and range of equivalents of the appended claims.

What is claimed is:

1. In a control apparatus for a high-voltage D.C. transmission system connecting three-phase current systems having respectively different frequencies, the apparatus including at least two units connected to operate in parallel during normal operation and each composed of a rectifier group and an inverter group, and means permitting one of the units to operate with its energy direction reversed in unusual situations, the improvement comprising: an individual power regulator for each said unit connected to receive a desired power signal indicating the magnitude and direction of power transmission by said unit; a common regulator connected to all of said power regulators for supplying thereto, in normal operation, the desired power signal based on the total power for all of said units; a voltage regulator for the three-phase voltage of one of the lines associated with said one unit and providing a signal representative of the magnitude of that voltage; and means switching the control of said regulator for said one unit from said common regulator to said voltage regulator, upon occurrence of an unusual situation, to cause reversed energy direction operation to occur at an energy level proportional to the value of the signal provided by said voltage regulator.

2. An arrangement as defined in claim 1 wherein each said unit includes a voltage limiting regulator connected to act on the semiconductor element control of the associated rectifier group and inverter group, and to receive a control signal representing the desired value for the limiting voltage at said one unit which can be operated with energy direction reversed from said voltage regulator, such that an increase in the magnitude of the three-phase voltage acts to reduce the desired level of the limit of the D.C. voltage.

3. An arrangement as defined in claim 2 wherein said voltage limiting regulator of said one unit is arranged to become effective only when the possible power of said one unit operated with energy direction reversed is fully utilized.

4. An arrangement as defined in claim 2 further comprising a variable-gain amplifier connected between said voltage regulator and said voltage limiting regulator of said one unit for deriving said control signal as a function of the difference between the value of the power represented by the signal provided by said voltage regulator and the maximum power level of said one unit during reversed energy direction operation.

5. An arrangement as defined in claim 1 further comprising function generator means for deriving a signal constituting a time-dependent ramp function element and connected for bringing the signal to said individual power regulator of said one unit to a value representing a desired power level of zero when said one unit is to operate with its energy direction reversed and to be deactuated after connection has been made to said voltage regulator.

* * * * *